United States Patent
Tilleman et al.

(10) Patent No.: US 10,654,450 B2
(45) Date of Patent: May 19, 2020

(54) DROPLET SENSOR

(71) Applicant: Rockwell Automation Technologies, Inc., Mayfield Heights, OH (US)

(72) Inventors: Michael M. Tilleman, Brookline, MA (US); Girish S. Mali, Nashua, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/127,903

(22) Filed: Sep. 11, 2018

(65) Prior Publication Data
US 2020/0079325 A1    Mar. 12, 2020

(51) Int. Cl.
*G01N 21/55* (2014.01)
*B60S 1/08* (2006.01)
*G01N 21/552* (2014.01)

(52) U.S. Cl.
CPC .......... *B60S 1/0833* (2013.01); *B60S 1/0881* (2013.01); *G01N 21/552* (2013.01)

(58) Field of Classification Search
CPC .............................. B60S 1/0833; B60S 1/0881
See application file for complete search history.

(56) References Cited

U.S. PATENT DOCUMENTS

| | | | |
|---|---|---|---|
| 5,483,346 A | 1/1996 | Butzer | |
| 6,118,383 A * | 9/2000 | Hegyi | B60S 1/0818 15/DIG. 15 |
| 6,153,995 A * | 11/2000 | Tanaka | B60Q 1/1423 307/10.1 |
| 6,196,704 B1 | 3/2001 | Gauch et al. | |
| 2017/0115235 A1 | 4/2017 | Ohlsson et al. | |

FOREIGN PATENT DOCUMENTS

| | | |
|---|---|---|
| DE | 4102146 | 9/1991 |
| DE | 10339696 | 4/2005 |
| DE | 103 58 199 B3 | 5/2005 |
| EP | 1685011 | 8/2006 |
| GB | 2 208 433 A | 3/1989 |
| JP | 2001330559 | 11/2001 |

OTHER PUBLICATIONS

Extended European Search Report received for EP Patent Application Serial No. 19196217.4 dated Jan. 17, 2020, 12 pages.

* cited by examiner

*Primary Examiner* — Muhammad S Islam
(74) *Attorney, Agent, or Firm* — Amin, Turocy & Watson, LLP (57) ABSTRACT

A droplet sensor system is configured to detect the presence of droplets or other foreign bodies on the surface of a window. The sensor system emits light rays that are coupled into the window, where the window serves as a waveguide that guides the confined electromagnetic radiation across the window. Foreign bodies present on the surface of the glass outcouples a subset of the light as it propagates across the window, attenuating the power of outcoupled light measured at a photodetector mounted near an edge of the window. The system initiates a notification or a control action in response to detecting this attenuation of power due to outcoupling of the propagating light by foreign bodies.

20 Claims, 10 Drawing Sheets

DROPLET SENSOR

BACKGROUND

The subject matter disclosed herein relates generally to window monitoring systems, and, for example, to detection of pollutants on the surface of a window.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system for detecting foreign bodies on a window is provided, comprising an emitter configured to control emission of light rays from one or more light sources toward a first edge of the window, wherein emission of the light rays toward the first edge of the window causes the at least a portion of the light rays to couple to the window and to propagate across the window to a second edge of the window as electromagnetic waves; a photodetector configured to measure a radiation power of outcoupled light rays that are outcoupled from the window; and a comparator configured to compare the radiation power with a baseline radiation value, and generate an output signal in response to a determination that a difference between the radiation power and the baseline radiation value satisfies a criterion.

Also, one or more embodiments provide a system, comprising a window, a light source coupled to a first edge of the window and configured to emit light toward the first edge causing a fraction of the light to be coupled to the window and to propagate across the window to a second edge of the window as electromagnetic radiation; a photodetector configured to measure a radiation power of outcoupled light, wherein the outcoupled light is a subset of the electromagnetic radiation that is outcoupled from the window; a comparator configured to determine a difference between radiation power of the outcoupled light and a baseline radiation value, and a output a control signal in response a determining that the difference satisfies a defined criterion.

Also, one or more embodiments provide a method for detecting contaminants on a window, comprising emitting, by a system comprising a processor, light rays toward a first edge of the window, wherein the emitting causes the at least a fraction of the light rays to couple to the window and to propagate across the window to a second edge of the window as electromagnetic waves; measuring, by the system, a radiation power of outcoupled light rays that are outcoupled from the window at the first edge or the second edge, wherein the uncoupled light rays are a subset of the electromagnetic waves; determining, by the system, a difference between the radiation power of the outcoupled light rays and a defined baseline radiation value; and in response to determining that the difference exceeds a defined threshold value, generating, by the system, an output signal that initiates a control operation.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Also, the term "VCSEL" which is an abbreviation for "Vertical Cavity Surface Emitting Laser" is used for both signal and arrays of VCSELs. State-of-the-art VCSEL arrays can contain up to ten thousands of individual VCSELs.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

In many scenarios it is useful to detect the presence of liquid and droplets on surfaces. For example, rain drops on windshields of motor vehicles could beneficially be monitored to determine a suitable time to activate windshield wipers and to control the speed of the windshield wipers as a function of the number density of the drops on the windshield. In another example scenario, windows of machinery on a manufacturing floor are often sprinkled with coolant liquids, grime, or other particulates. If these windows could be monitored for the presence of droplets or other contaminants, warnings could be issued or cleaning systems could be initiated when the droplet density reaches a threshold. For optical systems such as cameras or imaging sensors that include lenses or protective windows in front of the lenses that are susceptible to contamination, automatic detection of pollutants on the lens or protective window could trigger an automatic adjustment of the camera's parameters—e.g., the illumination level, exposure time, or aperture—to compensate for the reduced amount of light reaching the camera's sensor due to the elevated level of pollution.

Optical methods can be employed to monitor for presence of droplets, whereby optical probe beams are emitted to illuminate the window surface (e.g., in the invisible infrared spectral range), and beams reflected from the window surface are collected by special detectors. In such systems, the reflected light that is perturbed by the presence of droplets, so detection of this perturbation by the special detectors can be indicative of the presence of droplets. In such reflective detection systems, both the source of the probe beams and the detector must be installed in front of the window facing the surface of the window.

One or more embodiments described herein provide a droplet sensor that can be embedded in a window pane to detect the presence of liquid droplets and puddles on the window surface. Embodiments of the droplet sensor described herein utilize the principle of guidance of electromagnetic waves in a dielectric material. A window pane with air on both sides (adjacent to the front and rear surfaces of the window) acts as a three-layer waveguide in which the window is the second (middle) layer, and the first and third layers are air. Because the window—the middle layer of the waveguide—possesses a refractive index greater than that of the outer air layers, light rays emitted toward an edge of the window are coupled to the window, confined in the waveguide, and propagate across the window. The light is confined in the waveguide (comprising the window and surrounding air) by total internal reflection (TIR) and propagates in the medium with minimal losses. If external materials, such as droplets or other foreign bodies, are in contact with the window's surface, the power of the propagating light rays incurs detectable losses due to uncoupling of the confined energy as a result of contact with the external materials.

Based on this principle, a source of light—e.g., a light-emitting diode (LED), a laser diode, a vertical cavity surface emitting laser (VCSEL), or another type of light source—is coupled into the window at one edge, and a detector—e.g., a photodetector—that is disposed at an opposite edge of the window (or the same edge if the opposite edge is reflective) receives the outcoupled light or a fraction thereof that is outcoupled from the edge. If no foreign objects, such as the droplets, are in contact with the window surface, the photodetector receives a sequence of unperturbed light signals that, if calibrated, indicate the magnitude of the coupled light. If a foreign object is in contact with the window surface, the object outcouples a fraction of the light from the surface of the window before this fraction of light reaches the edge, thereby funneling a fraction of the confined electromagnetic radiation in the window and effectively reducing the signal measured by the photodetector. The amount of electromagnetic radiation funneled out of the window is related to the number and size of foreign bodies in contact with the window as well as the location of the droplet. The funneling is also dependent on the physical properties and constants of the material that makes up the foreign bodies. For a given foreign body, such as a water droplet, the larger the body and the more bodies that attach to the window surface, the greater is the reduction of the detected signal.

Figure 1:
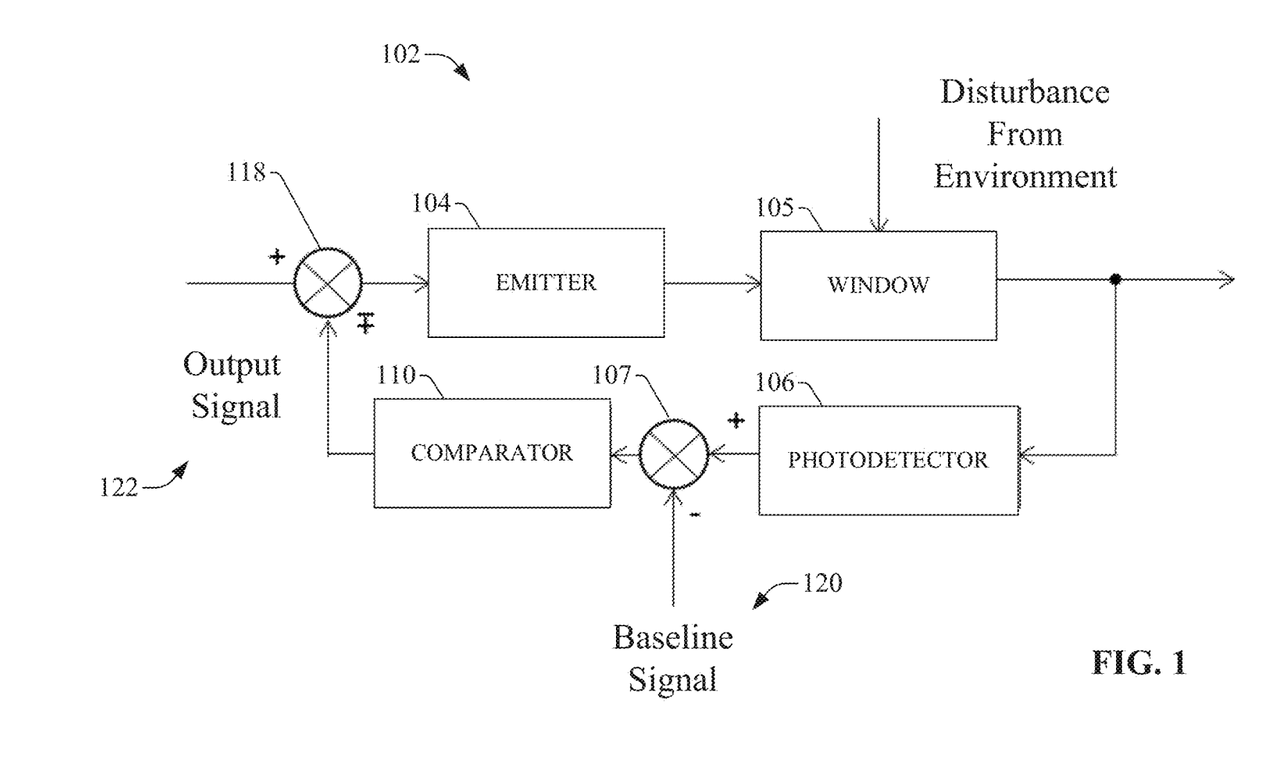
FIG. 1 is a control diagram of an example droplet sensor system.

FIG. 1 is a control diagram of an example droplet sensor system 102 according to one or more embodiments of this disclosure. Although embodiments of droplet sensor system 102 are described herein in the context of droplet detection, the principles of droplet sensor system described herein can be used to detect other types of foreign bodies in contact with a window. Aspects of the systems, apparatuses, or processes explained in this disclosure can constitute machine-executable components embodied within machine (s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Droplet sensor system 102 can include an emitter 104, a photodetector 106 and associated circuitry (including an amplifier), a comparator 110, and summing points 118 and 107 (which may be realized either digitally or as analog circuits). Droplet sensor system 102 can also comprise a memory, and in some embodiments may also comprise one or more processors. Droplet sensor system is configured to interact with a window 105 to detect foreign bodies on the surface of the window as will be described below. In various embodiments, one or more of the emitter 104, photodetector 106, comparator 110, and summing points 118 and 107 can be electrically and/or communicatively coupled to one another to perform one or more of the functions of the droplet sensor system 102. In some embodiments, components of the droplet sensor system 102 depicted in FIG. 1 can be realized as analog circuits. In other embodiments, components of the droplet sensor system 102 can be realized as a digital system, wherein one or more of components 104, 106, 107, 110, or 118 or portions thereof comprise software instructions stored on a memory and executed by a processor. Droplet sensor system 102 may also interact with other hardware and/or software components not depicted in FIG. 1. For example, processor(s) 118 may interact with one or more external user interface devices, such as a keyboard, a mouse, a display monitor, a touchscreen, or other such interface devices. In some embodiments, photodetector 106 may include an amplifier comprising one or more stages.

The emitter 104 can be configured to emit light rays by one or more associated light sources, such as LEDs, laser diodes, VCSELs, or other types of light sources. Photodetector 106 can be configured to measure power of light radiation received at one or more associated photodetectors. As will be described below, the light radiation measured by the photodetector 106 is sourced primarily by the light sources of emitter 104. When the window 105 is affected by a disturbance from the environment, such as one or more liquid droplets, a fraction of the optical radiation propagating in the window is outcoupled, resulting in a loss of radiation power of the propagating radiation. This loss is manifested by a decrease of optical power, energy, irradiance, radiance, illuminance, or luminance of the radiation reaching the photodetector 106.

Comparator 110 can read the voltage summation performed by summing point 107, which compares the power (or energy, irradiance, radiance, illuminance, or luminance) of the light radiation measured by photodetector 106 with a baseline radiation signal 120. Based on this comparison, comparator 110 determines whether the difference between the measured radiation and the baseline radiation value exceeds a threshold indicative of a droplet or other foreign body on a window. Comparator 110 can be configured to generate an output signal 122 in response to a determination by the summing point 107 that the difference between the measured radiation and the baseline radiation represented by baseline signal 120 exceeds the threshold value. The output signal can be configured to either deliver a notification to an associated interface or to a client device, or to initiate a control operation (e.g., start a windshield wiper, alter a speed of a windshield wiper, adjust a level of camera illumination to compensate for the detected pollution, adjust a camera's exposure settings to compensate for the detected pollution, etc.).

Figure 2:
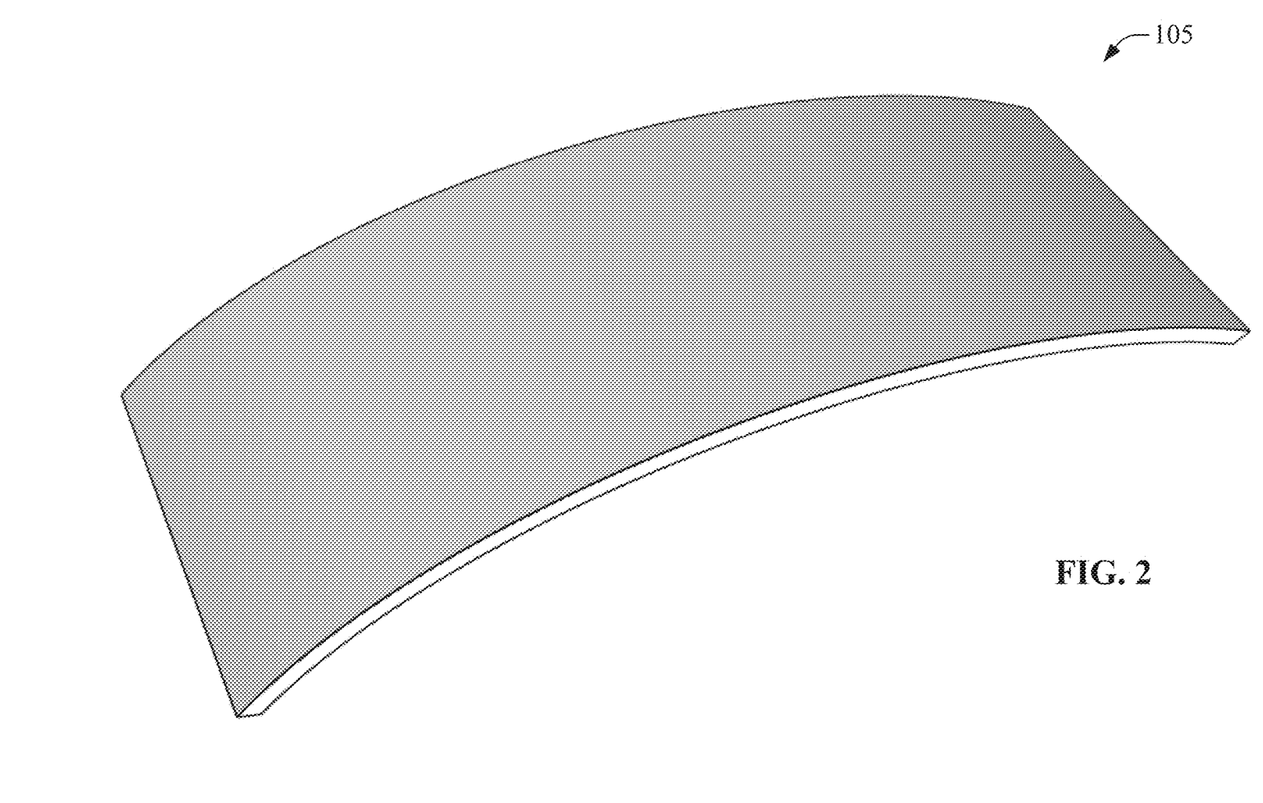
FIG. 2 is a schematic of an example window on which embodiments of the droplet sensing system can be used.

FIG. 2 is a schematic of an example window 105 on which embodiments of the droplet sensor system 102 can be used. Although the following examples describe the sensing system as detecting liquid droplets, it is to be appreciated that other types of foreign bodies can also be detected on the window 105 using embodiments of droplet sensor system 102. In an example embodiment, window 105 can be made of glass with a refractive index of nearly 1.5, while the surrounding air has a refractive index of nearly 1. In various other embodiments, window 105 may be a polymer slab, or a layered slab comprising polymers and glass. In general, window 105 can be any dielectric slab capable of acting, together with surrounding air, as a waveguide for electromagnetic radiation. In the embodiment depicted in FIG. 2, example window 105 has a bent or curved profile. In other embodiments, window 105 can have a planar surface, a cylindrical-sector surface, a spherical-sector surface, or other topological surfaces.

Window 105 may be a window of substantially any type of application in which detection of foreign bodies on the window 105 would be beneficial. For example, window 105 may be an automotive windshield, a component of an automotive headlight, a window pane, an canopy (e.g., an aircraft canopy), a window used in a luminary, a bar code scanner window, a window of an imaging and sensing device (e.g., 2D and 3D sensing devices), a viewing window of a submarine or a spaceship, a window of a signaling system used in dirty environments, or another type of window.

Figure 3:
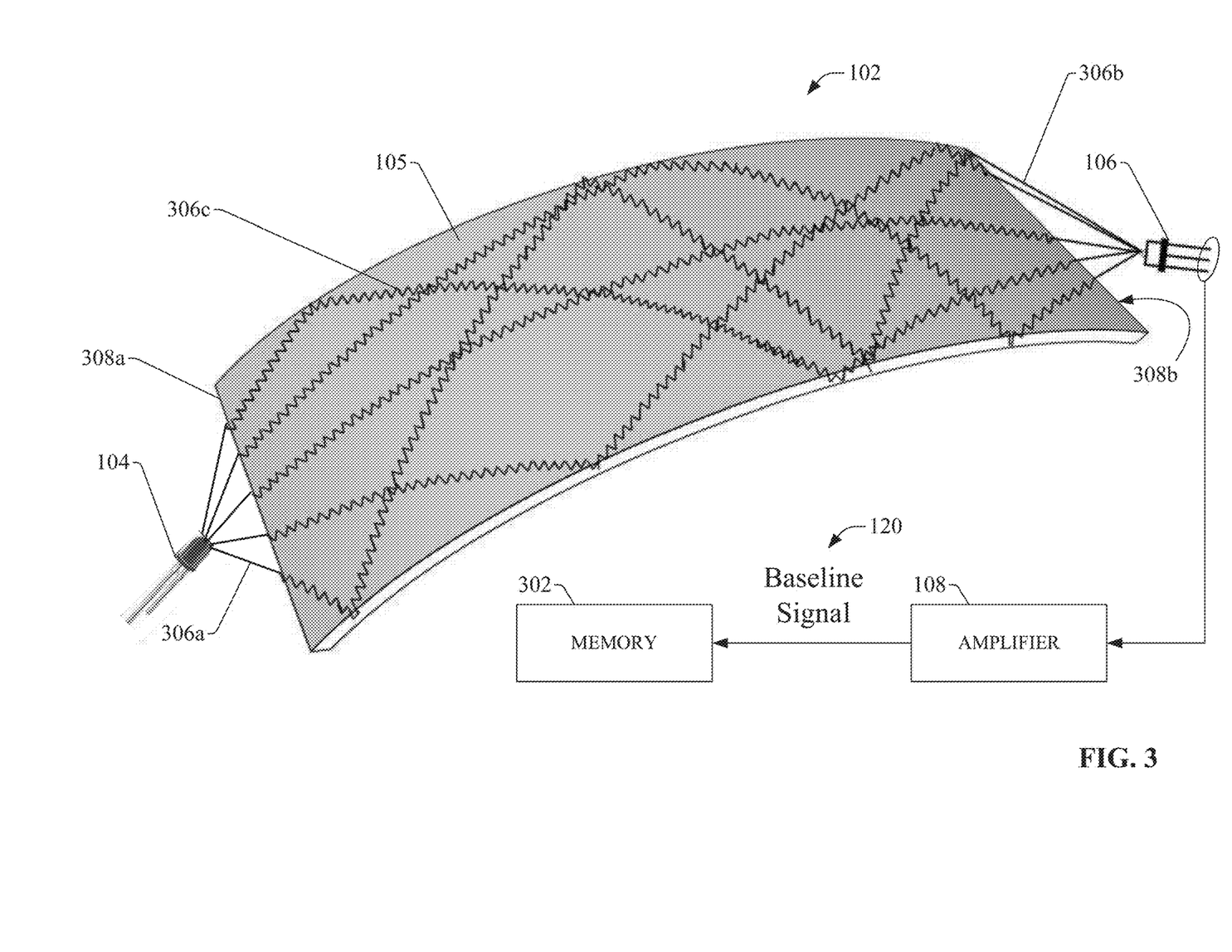
FIG. 3 is a schematic of an example droplet sensor system illustrating a calibration stage.

FIG. 3 is a schematic of an example droplet sensor system 102 in which components of droplet sensor system 102 monitor window 105. The scenario depicted in FIG. 3 represents a calibration stage during which window 105 is free of foreign bodies and a baseline value is measured and stored for subsequent comparison purposes during normal operation of the system 102. Emitter 104 (e.g., an LED, laser diode, VCSEL, or another type of light source) emits rays 306a directed toward a first edge 308a of window 105, and a photodetector 106 is directed toward a second edge 308b of the window 105 opposite the first edge 308a collects the radiation 306 outcoupled from the window 105. When light rays 306a are emitted from emitter 104 toward the first edge 308a, a fraction of the rays 306a are coupled to the window 105. The coupled light propagates in the window 105 as electromagnetic (EM) waves 306c representing some ten thousand modes (the EM waves 306c illustrated in FIG. 3 represent only a subset of all the rays emitted from emitter 104). In some embodiments, the wavelength of the coupled light is 850 nanometers (nm) and the window thickness is 5 millimeters (mm), in which case approximately 26,000 EM modes are sustained.

When the propagating EM waves 306c reach the second edge 308b of window 105, the EO waves are outcoupled as rays 306b at the second edge 308b, and a fraction of the outcoupled rays 306b are received at the photodetector 106. Note that rays 306b illustrated in FIG. 3 represent only a subset of the total outcoupled rays that arrive at the photodetector 106. Only a fraction of the emitted rays 306a are detected by the photodetector 106. However, this fraction remains substantially constant provided no additional losses are present. In some embodiments, photodetector 106 can be coupled to the window 105 such that the photodetector 106 is mounted at or near a node of maximum power of the outcoupled rays 306b. Also, in some embodiments, window 105 can be configured to serve as an optical Talbot resonator that yields self-images of an array of light sources of emitter 104 at certain distances from the light sources. In such embodiments, the photodetector 106 can be coupled to the window 105 at or near a location of self-image of the light sources. The window in such embodiments can have a Talbot configuration of at least one of single object and single image, single object and multiple images, multiple objects and a single image, or multiple objects and multiple images.

To ensure good coupling into the window 105, and thus good guidance of the propagating waves across the window 105, the ray with the maximum angle of incidence must undergo total internal reflection (TIR) in the window 105. That is, for the above indices the angle of incidence should exceed 42°. This permits angle of incidence within the range of 0° to almost 90°. However, the practical angle may be smaller due to Fresnel reflections. Assuming a flat, uncoated window edge 308a made of glass (approximate reflective index of 1.5) and assuming a maximum unpolarized 12% power loss due to the reflection at an incidence angle of 70° yet smaller reflection losses at smaller angles of incidence, this determines the smallest internal angle of approximately 42°. The total coupling losses are greater than merely the Fresnel reflection losses, including losses of source compatibility associated with the source étendue, mode coupling losses, and other losses.

The signal generated by photodetector 106 due to detected radiation is converted to electric current, subsequently amplified by amplifier 108, and converted to voltage. At the conclusion of this calibration stage, this measured and stored voltage represents a baseline signal 120, which is stored in an electronic memory 302. In some embodiments, rather than being stored as a voltage value, the baseline voltage can also be converted to a digital value and stored on memory for reference.

Figure 4:
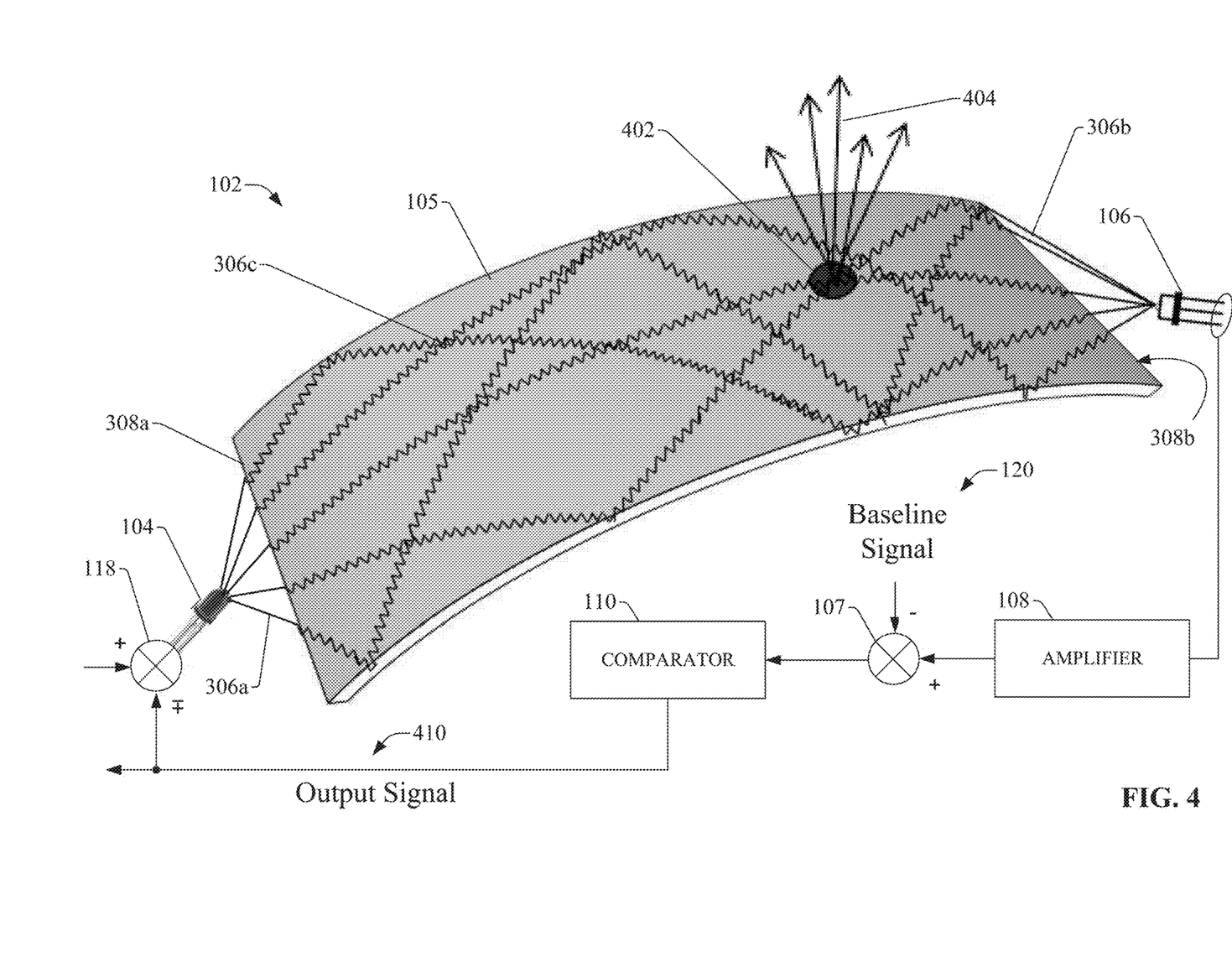
FIG. 4 is a schematic of example droplet sensor system depicting normal operation after calibration of the system.

During normal operation after completion of the calibration stage, system 102 uses the stored baseline signal 120 for comparison purposes to detect presence of foreign bodies on window 105. If a foreign body, such as a liquid droplet, contacts the surface of window 105, the foreign body acts as an outcoupler that funnels a fraction of the confined electromagnetic radiation from the window 105 and consequently reduces the amount of radiation reaching the photodetector 106. FIG. 4 is a schematic of droplet sensor system 102 depicting normal operation after calibration of the system 102. In this example, a foreign body 402—e.g., a droplet of liquid—is in contact with the surface of window 105, the foreign body 402 constituting a disturbance. When the foreign body 402 is attached to window 105, the body 402 outcouples a fraction of the propagating EM wave 306c, thereby modulating the radiation power of the propagating light waves. The outcoupled rays funneled by foreign body 402 are depicted in FIG. 4 as rays 404. When the remaining rays 306b reach the photodetector 106, the radiation loss due to the outcropping of rays 404 by foreign body 402 causes the radiation power measured by the photodetector 106 to be lower than that measured by photodetector 106 when no foreign bodies 402 are present on the window 105 (that is, lower than in the scenario depicted in FIG. 3).

This reduction in the measured radiation power can be identified by the droplet sensor system 102. During normal operation of the sensor system 102, the radiation power of outcoupled rays 306b is measured by the photodetector 106 and the corresponding electrical signal is amplified by the amplifier 108. The resulting amplified signal is introduced to the summing point 107, where it is combined with the negative value of the baseline signal 120, representing the expected radiation power when the window 105 is free of foreign bodies. The output of summation point 107 is the difference between the baseline signal 120 and the amplified measured signal from amplifier 108, and this difference output is provided to comparator 110. If comparator 110 determines that the measured radiation value is less than the baseline signal 120 and that the difference between the two values exceeds a difference threshold indicative of an unacceptable amount of foreign bodies on window 105, comparator 110 generates an output signal 410.

Comparator 110 can be configured to generate any suitable output signal 410 according to the needs of the application in which sensor system 102 is used. For example, in some embodiments comparator 110 can generate a notification signal directed to a graphical interface, a client device, or another type of notification device indicating that window 105 must be cleaned. In another example, output signal 410 may be a control signal that instructs a window cleaning system—e.g., a windshield wiper system or another type of cleaning system—to initiate a window cleaning sequence that cleans the foreign bodies 402 off of window 105. In implementations in which the window cleaning system is configured with multiple operating modes, comparator 110 may be configured to select an operating mode for the window cleaning system based on the degree of difference between measured radiation value and baseline signal value. In general, the greater the difference between measured radiation value and baseline signal value, the larger the degree of contamination that is likely to be present on window 105. Accordingly, comparator 110 can be configured to initiate an operating mode for the window cleaning system as a function of this difference, such that a less rigorous cleaning sequence (e.g., a low-speed wiping sequence) is initiated if the difference is greater than the cleaning initiation threshold but less than a second threshold (higher than the cleaning initiation threshold), and a more rigorous cleaning sequence (e.g., a high-speed wiping sequence) is initiated if the difference is greater than the second threshold. Any number of cleaning sequence degrees can be defined and controlled in this manner in various embodiments.

In applications in which window 105 is a window pane of a camera or other type of optical sensor, the output signal 410 can be configured to adjust an operating parameter of the camera to compensate for the reduced amount of light received by the camera's sensor as a result of the elevated level of pollution on the window 105. For example, in response to detecting that the measured radiation value has fallen below the baseline signal value by a defined amount, comparator 110 can increase the amount of illumination emitted by the camera when acquiring an image, increase an exposure time of the camera, or increase the camera's aperture setting in order to compensate for the elevated amount of pollution on the window 105, which may otherwise cause less light from the field of view to be received at the camera's sensor.

The difference between the measured radiation and the baseline radiation value can also be used by the comparator 110 to quantify the amount of pollution on the window 105, since the amount of the difference generally increases as a function of the amount of the difference. Accordingly, in some embodiments comparator 110 can translate the difference between the measured radiation and the baseline signal value into a pollution metric that indicates a degree of pollution on window 105, and generate a notification signal that conveys this measured degree of pollution on a graphical interface or client device. This measured degree of pollution can also be used by the comparator 110 in some embodiments to instruct an associated system to implement an appropriate countermeasure. For example, if window 105 is a windshield or observation window with an associated windshield wiper system, comparator 110 can set the speed of the windshield wiper system as a function of the difference between the measured radiation and the baseline signal value, where the speed of the windshield wiper system is increased as the difference between the measured radiation and the baseline radiation value increases.

In another application in which window 105 is a protective window of a lens of a camera or another type of optical sensor, comparator 110 can be configured to set an amount of illumination projected by the camera when acquiring an image as a function of the difference between the measured radiation and the baseline signal value (e.g., by increasing the amount of illumination as the difference between the measured radiation and the baseline radiation value increases in order to compensate for the elevated level of pollutant on the window 105). In addition or alternatively, comparator 110 can be configured to set an aperture opening (e.g., an f-stop number) or an exposure time of the camera as a function of the difference between the measured radiation and the baseline signal value in order to compensate for the reduced amount of illumination that reaches the camera's lens due to the elevated level of pollutants on the window 105.

In yet another example application in which window 105 is a protective window for a lens of a time of flight (TOF) camera used in an automated guided vehicle to determine the distances of objects in proximity of the vehicle, comparator 110 can be configured to reduce the maximum speed of the vehicle or to increase the safe distance configured for the camera (that is, the minimum clearance distance in front of the vehicle, where detection of objects within the minimum clearance distance causes the vehicle to slow, stop, or alter direction) in response to a determination that the level of pollutant on the window 105 has reached a level that may induce detection problems in the camera.

Figure 5:
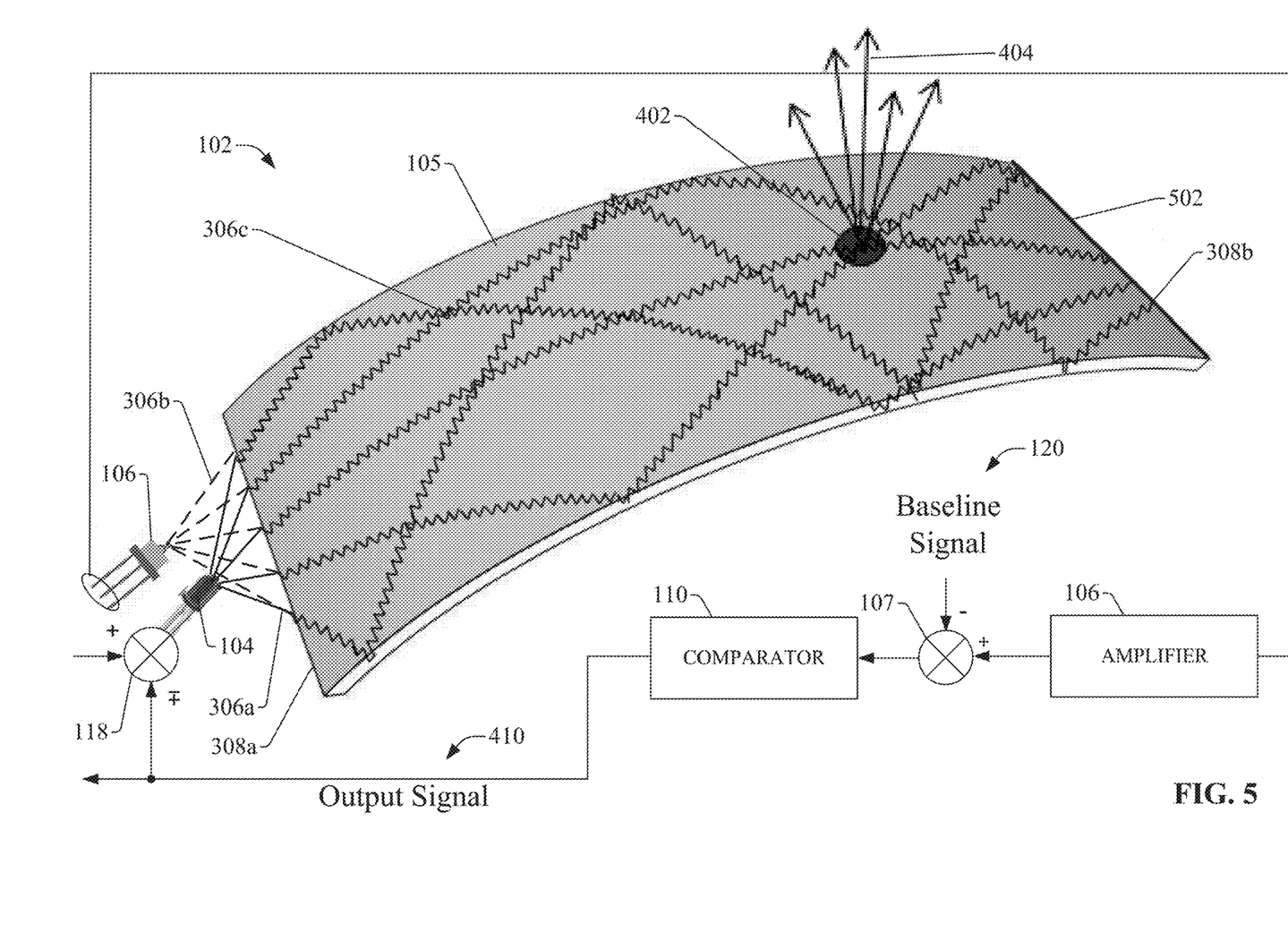
FIG. 5 is a schematic of a droplet sensor system in which a light source and a photodetector are disposed at the same edge of the window.

FIG. 5 is a schematic of another embodiment of droplet sensor system 102 in which emitter 104 and photodetector 106 are disposed at the same edge 308a of window 105. In this embodiment, the opposite edge 308b of window 105 is coated with a reflective layer 502. Similar to the embodiment described above in connection with FIGS. 3 and 4, light rays 306a are emitted by emitter 104 and are directed toward the first edge 308a of window 105. Light rays 306a are coupled into the window 105 and propagate in the window 105 to the second edge 308b. Upon reaching the second edge 308b, the incident radiation of waves 306c is reflected by the reflective layer 502 and propagate in the window 105 back to the first edge 308a, where the rays are decoupled as rays 306b and received by photodetector 106. As in the embodiment described above, system 102 generates an output signal 410 in response to determining that the measured radiation power of rays 306b drops below the value of the baseline signal 120 by a degree indicative of the presence of one or more foreign bodies 402 on window 105.

Although the examples described above are described in terms of a single light source (emitter 104) and a single photodetector 106, various embodiments of the droplet sensor system 102 may use any number of light sources and any number of photodetectors 106. In general, the placement of the emitters 104 and photodetectors 106 is such as to optimize the amount of the outcoupled radiation reaching the photodetectors. In each of the embodiments described above, a foreign body 402 that is in contact with the surface of window 105 outcouples radiation from the confined propagating radiation, thus causing a radiation loss and a corresponding reduction in the amount of radiation power measured by photodetector 106. This measured loss, when determined to be below a defined threshold indicative of an unacceptable amount of foreign material on window 105, causes the sensor system 102 to generate a suitable notification or control signal.

Figure 6:
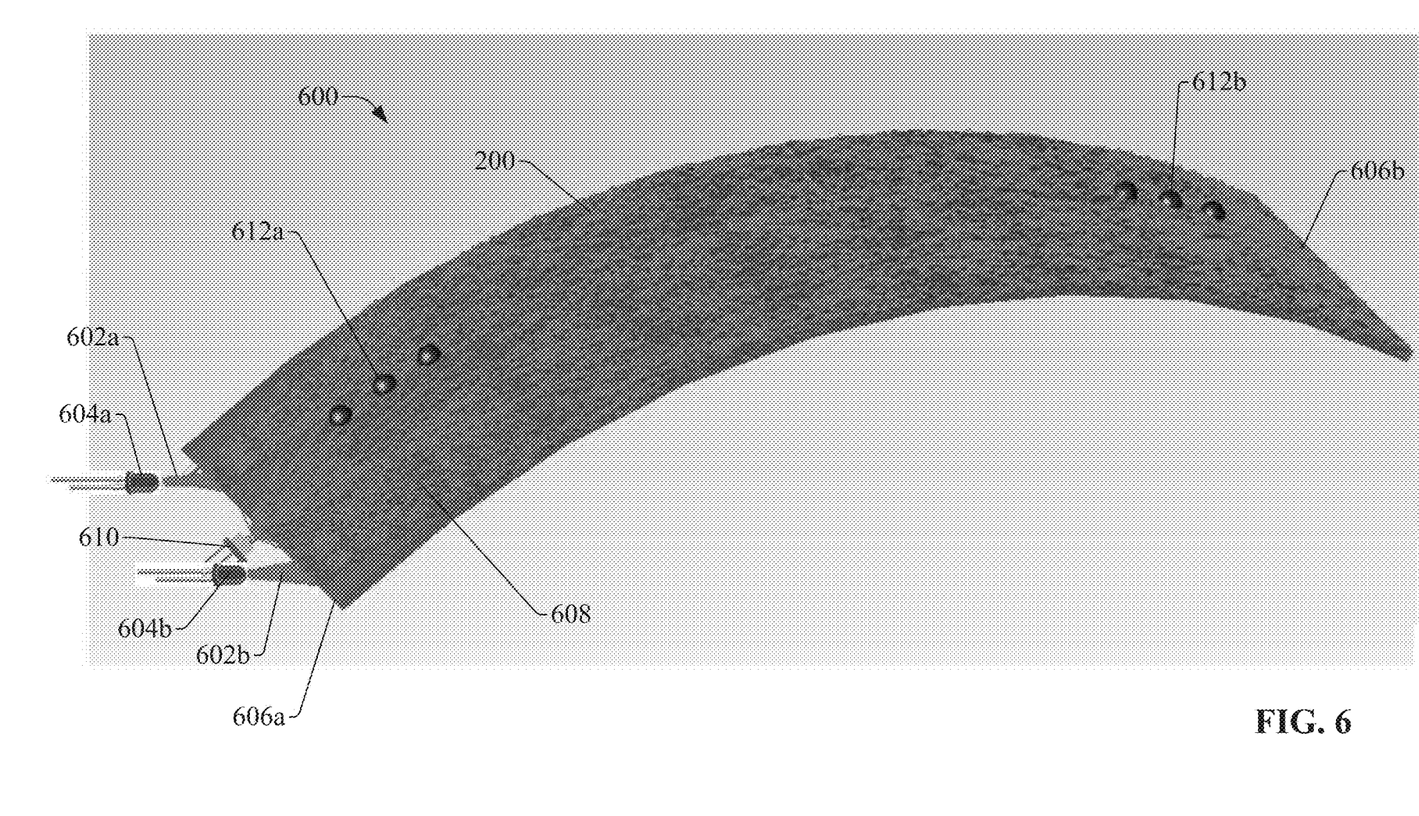
FIG. 6 is a schematic of an example droplet sensor system in which light rays are emitted from two light sources.

FIG. 6 is a schematic of an example droplet sensor system 600, in which light rays 602a and 602b are emitted from two light sources 604a and 604b, respectively. Light rays 602a and 602b are coupled into the window 105 at a first edge 606a of window 105 and are guided in the window 105 as radiation waves 608. The second edge 606b of window 105 is reflectively coated, such that radiation waves 608 are bounced off of the reflective coating at the second edge 606b and the reflected radiation waves 608 propagate in the window 105 in the opposite direction toward the first edge 606a. The reflected radiation is then outcoupled at the first edge 606a, and a fraction of the outcoupled radiation waves are received and measured by photodetector 610, which is directed toward the first edge 606a along with light sources 604a and 604b.

Sets of droplets 612a and 612b are attached to the surface of window 105 in this example, outcoupling a fraction of the propagating wave 608 from the system 600. Consequently, the outcoupled rays that reach photodetector 610 carry less power relative the outcoupled rays received when no droplets are on the surface of the window 105. The reduced radiation power is measured and identified by the system 600 as described above, and the comparator 110 generates an output signal based on the presence of droplets 612a and 612b in response to determining that the radiation loss exceeds a defined threshold.

In some embodiments, additional information about the nature of the foreign bodies attached to window 105 can be obtained by applying different surface charges on the window 105 (the dielectric slab) so that the nature of the pollutants can be characterized.

Figure 7:
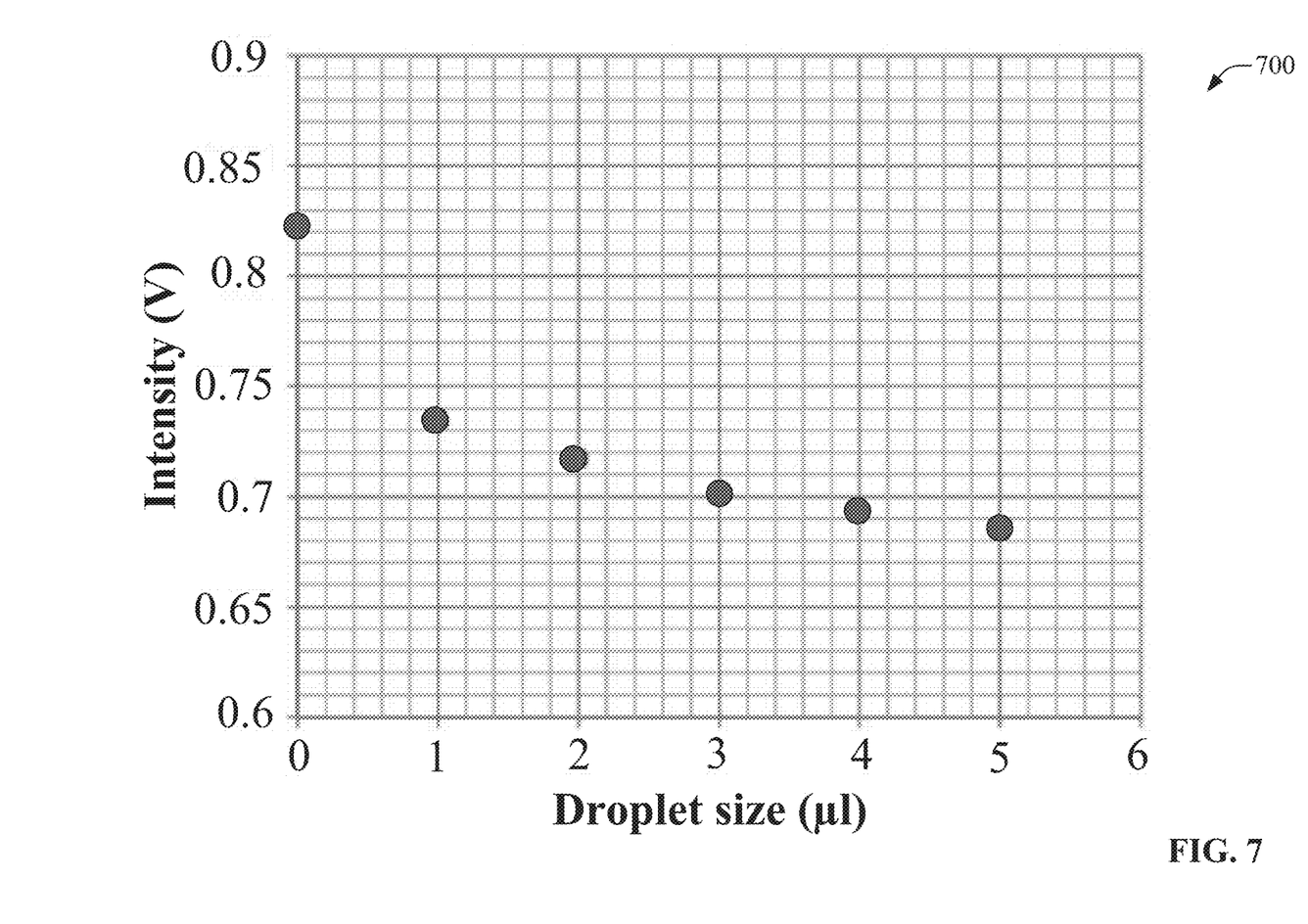
FIG. 7 is a graph that plots test results conducted on an embodiment of a droplet sensor system using water droplets of various sizes applied one droplet at a time.

FIG. 7 is a graph 700 that plots test results conducted on an embodiment of droplet sensor system 102 using water droplets of various sizes applied one droplet at a time. Graph 700 plots the signal voltage measured by the system 102 (the y-axis) against the droplet volume (the x-axis). Starting with a volume 0—that is, no droplet at all—the measured signal is 820 millivolts (mV). The measured signal decreases once droplets with a volume of 1, 2, 3, 4 and 5 microliters are attached to the surface of window 100 to levels of 735, 720, 700, 690 and 685 mV, respectively. The presence of a droplet on the window 105 depletes the confined radiation in the system, and this reduction in radiation is measured and detected by the system 102. The water volume was measured using a dispensing pipette.

Figure 8:
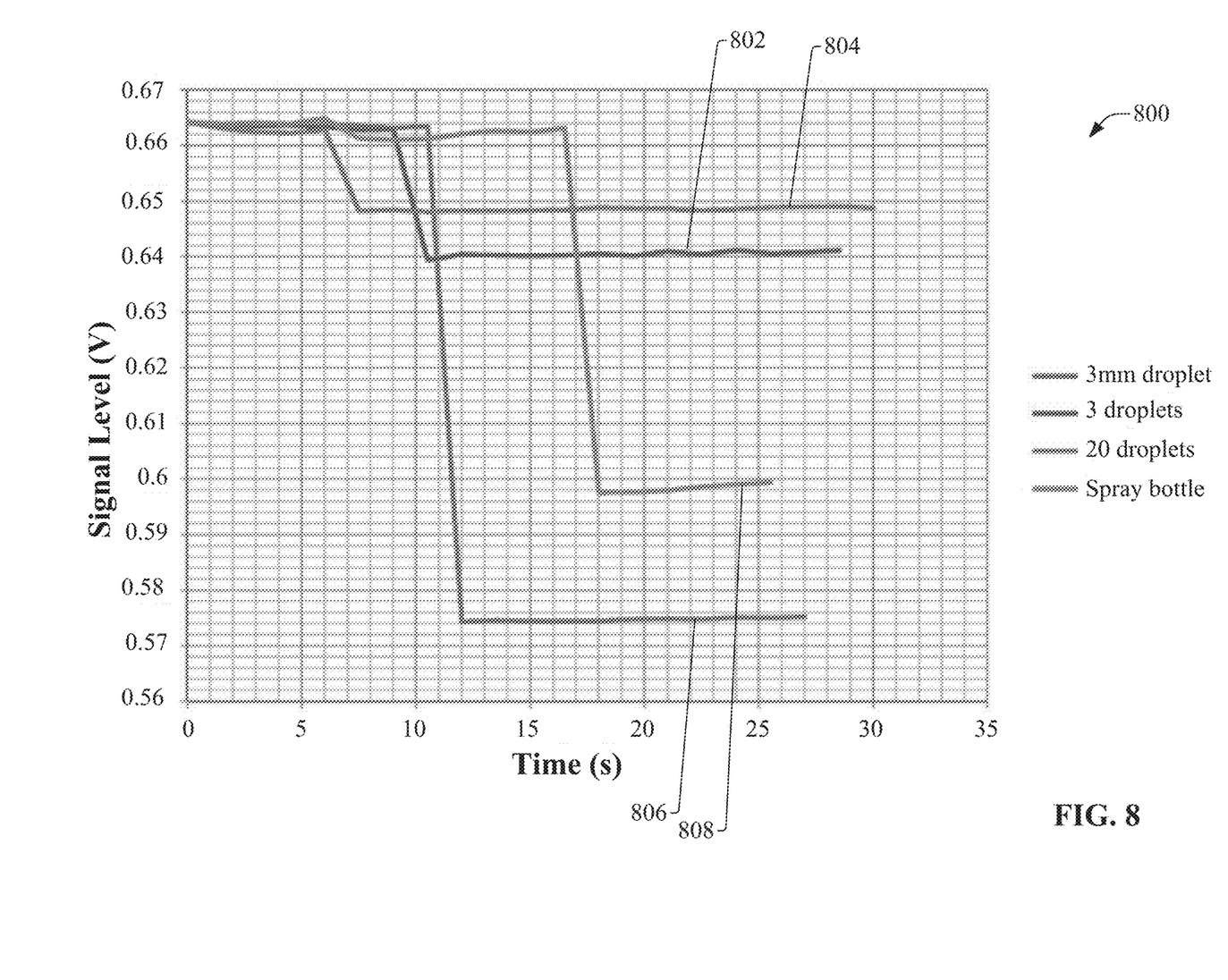
FIG. 8 is a graph showing test results conducted on a droplet sensor system using various numbers and sizes of water droplets.

FIG. 8 is a graph 800 showing test results conducted on a droplet sensor system 102 using various numbers and sizes of water droplets. Graph 800 plots the measured signal voltage (the y-axis) as a function of time (the x-axis) for various numbers and sizes of water droplets. Line 804 plots the signal level for 20 droplets. Line 802 plots the signal level for three droplets. Line 808 plots the signal level for droplets applied by a spray bottle. Line 806 plots the signal level for a single droplet having a wet diameter of 3 mm, which corresponds to a water droplet having a volume of 1 microliter adhering to a smooth glass surface. The system 102 responds with a finite time lag to the presence of the droplets, depending on the magnitude of the radiation power, waveform and frequency and the location of the droplets on the surface. For the system 102 used in this test the response time is between 6 to 17 seconds. The smallest droplets, atomized from a spray bottle (line 808), show the longest response time, while the larger droplets (line 804) yield the shortest response time. The shortest response time occurs due to 20 droplets having a volume of 1 microliter each.

Figure 9A:
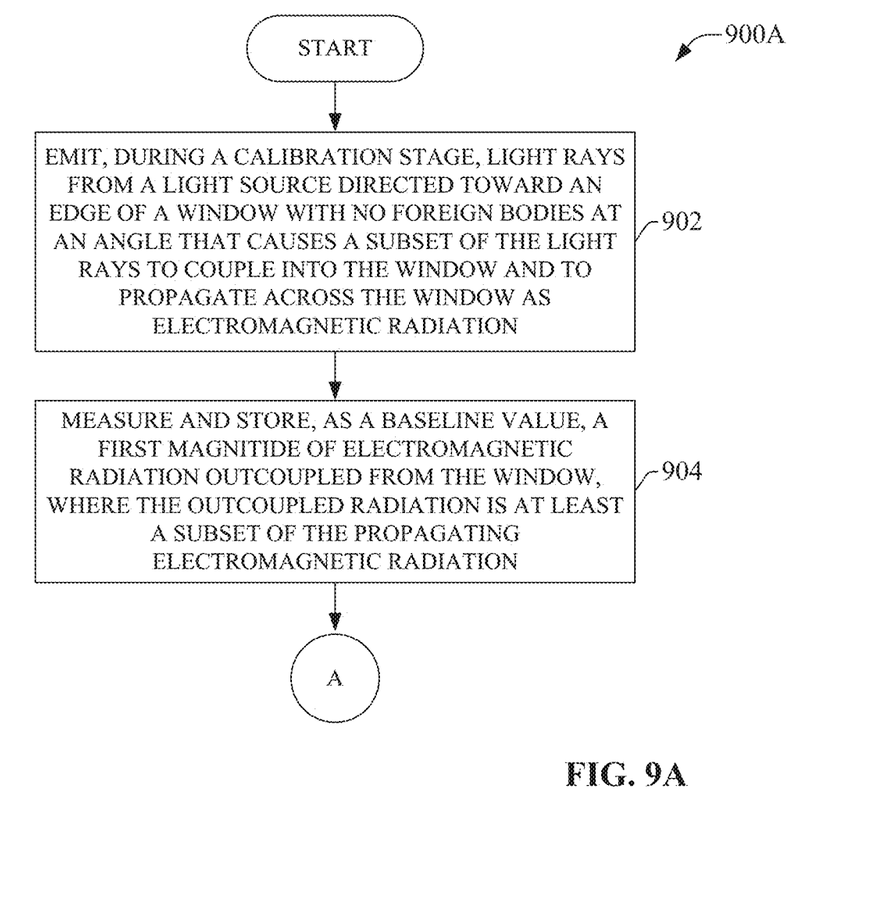
FIG. 9A is a flowchart of a first part of an example methodology for detecting foreign bodies, such as droplets, on a window.
Figure 9B:
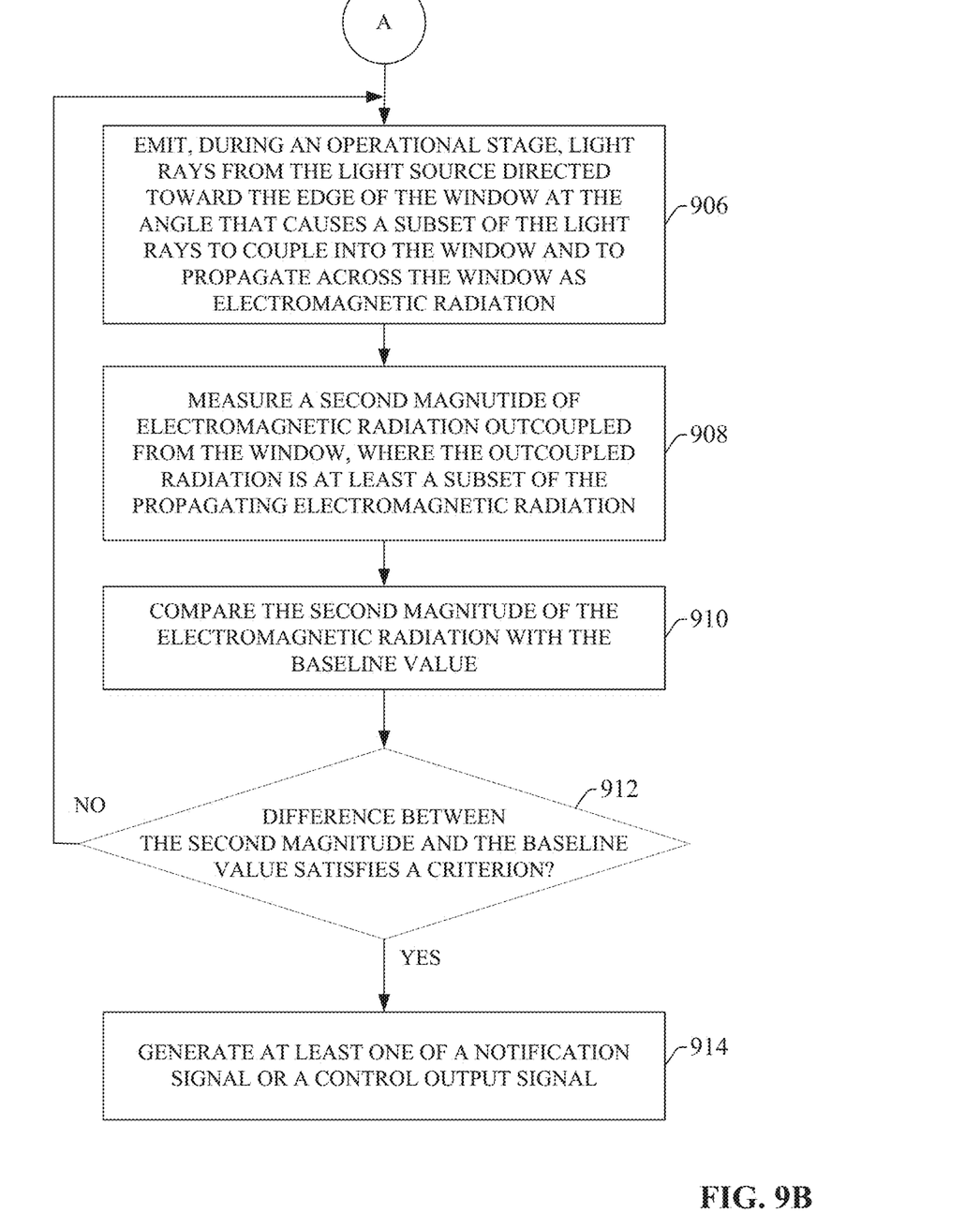
FIG. 9B is a flowchart of a second part of the example methodology for detecting foreign bodies, such as droplets, on a window.

The techniques described herein can effectively detect the presence of droplets or other foreign bodies on a window using waveguide principles, which allow the light source and the photodetector to be installed near the edges of the window rather than being mounted in front of the window as in reflective methods. The detection system described herein can be suitable used to monitor for foreign bodies on windshields, camera lenses, protective windows, canopies, bar code scanners, time of flight cameras, or other applications in which window particulates must be monitored FIGS. 9A-9B illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9A illustrates a first part of an example methodology 900A for detecting foreign bodies, such as droplets, on a window. The first part of the methodology 900A represents a calibration stage, during which a droplet sensor system acquires the magnitude of baseline radiation for storage in memory and subsequent comparison during normal operation. Initially, at 902, light rays are emitted from a light source and directed toward an edge of the window at an angle such that a substantial fraction of the EM radiation is coupled to the window and subsequently propagates across the window. In this regard, the window and the layers of air surrounding the window act as a waveguide since the window layer possesses a refractive index that is greater than that of the air. As a result, the EM radiation is guided in the window pane.

At 904, a first magnitude of EM radiation of outcoupled rays is measured and stored as a baseline value or signal. The outcoupled rays comprise at least a fraction of the propagating EM radiation that is outcoupled at an edge of the window. In some embodiments, the outcoupled light rays may be outcoupled at an edge opposite to that to which the emitted light rays were directed at step 902. In other embodiments, the opposite edge may have a reflective coating that causes the propagating waves to propagate back toward the edge to which the emitted rays were directed, and the outcoupled rays are outcoupled from the same edge to which the emitted rays were directed. The stored baseline value is indicative of a window that is free of attached foreign bodies.

The methodology then proceeds to the second part 900B illustrated in FIG. 9B. The second part of the methodology 900B represents a normal operation stage during which the window is monitored for presence of foreign bodies based on the stored baseline signal measured a priori during the first part of the methodology 900A. At 906, light rays are emitted from the light source and directed toward the edge off the window in a manner similar to step 902. At 908, a second magnitude of EM radiation of outcoupled light rays are measured, where the outcoupled light rays comprise at least a fraction of the propagating EM radiation that is outcoupled from the window (similar to step 904).

At 910, the second magnitude of EM radiation measured at step 908 is compared with the baseline signal measured and stored at step 904. At 912, a determination is made as to whether the difference between the measured EM radiation magnitude obtained at step 908 and the baseline value stored at step 904 is less than a defined threshold indicative of an excessive number of foreign bodies on the window, or an excessive size of a foreign body on the window. If the difference between the measured EM radiation magnitude and the baseline value exceeds the defined threshold (YES at step 912), the methodology proceeds to step 914, where at least one of a notification signal or a control output signal is generated. The control output signal may be a signal that initiates operation of a window cleaning system designed to remove foreign bodies from the window. In some embodiments, the control signal may be configured to set an operating mode of the window cleaning system as a function of the degree of difference between the measured radiation power and the baseline radiation value. In other embodiments, the control output may set a parameter of a camera system to compensate for the reduced amount of light reaching the camera's sensor due to the elevated level of pollutant on the window.

If the difference between the measured radiation power and the baseline value does not exceed the defined threshold (NO at step 912), the methodology returns to step 902 and steps 902-912 repeat.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims. For instance, all the lenses described above may be either refractive lenses, refractive Fresnel lenses, binary lenses, diffractive lenses, holographic optical elements or a combination of such lenses.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for detecting foreign bodies on a window, comprising:
   an emitter configured to control emission of light rays generated by one or more light sources and directed toward a first edge of the window, wherein emission of the light rays toward the first edge of the window causes at least a portion of the light rays to couple to the window and to propagate across the window to a second edge of the window as electromagnetic waves;
a photodetector configured to measure a radiation power of outcoupled light rays that are outcoupled from the first edge or the second edge of the window; and
a comparator configured to
compare the radiation power with a baseline radiation value, and
generate an output signal in response to a determination that a difference between the radiation power and the baseline radiation value exceeds a defined threshold value.

2. The system of claim 1, wherein the outcoupled rays comprise at least a subset of the light rays that are outcoupled from the second edge of the window.

3. The system of claim 1, wherein the electromagnetic waves are reflected from the second edge of the window, and the outcoupled rays comprise at least a subset of the light rays that are outcoupled from the first edge of the window.

4. The system of claim 1, wherein the output signal is configured to cause a notification to be rendered on at least one of a graphical interface or a client device, and the notification indicates that one or more foreign bodies are present on the window.

5. The system of claim 4, wherein the notification further indicates a level of contamination of the window by the one or more foreign bodies as a function of the difference between the radiation power and the baseline radiation value, the one or more foreign bodies comprising at least one of one or more liquid droplets or one or more solid particles.

6. The system of claim 1, wherein the output signal is configured to initiate operation of a window cleaning system.

7. The system of claim 6, wherein the comparator is configured to select an operating mode for the window cleaning system based on an amount of the difference between the radiation power and the baseline radiation value.

8. The system of claim 1, wherein the output signal is configured to at least one of increase a power of an illumination source, increase an aperture opening of a photodetector, or increase an integration time setting of the photodetector based on an amount of the difference between the radiation power and the baseline radiation value.

9. A system, comprising:
a window;
a light source coupled to a first edge of the window and configured to emit light toward the first edge causing a fraction of the light to be coupled to the window and to propagate across the window to a second edge of the window as electromagnetic radiation;
a photodetector configured to measure a radiation power of outcoupled light, wherein the outcoupled light is a subset of the electromagnetic radiation that is outcoupled from the first edge or the second edge of the window;
a comparator configured to
determine a difference between the radiation power of the outcoupled light and a baseline radiation value, and
output a control signal in response a determining that the difference is greater than a defined threshold value.

10. The system of claim 9, wherein the photodetector is coupled to the second edge of the window, and the outcoupled light comprises the subset of the electromagnetic radiation that is outcoupled from the second edge.

11. The system of claim 9, wherein
the second edge comprises a reflective coating that reflects the electromagnetic radiation toward the first edge of the window as reflected electromagnetic radiation,
the photodetector is coupled to the first edge, and
the outcoupled light comprises the subset of the reflected electromagnetic radiation that is uncoupled from the first edge.

12. The system of claim 9, wherein the window is at least one of a vehicle windshield, an observation window, a protective window of a camera lens, a headlight, a canopy, a bar code scanner window, or a protective window of a sensor device.

13. The system of claim 9, wherein the window has a topological shape comprising at least one of a plane, a hollow cylindrical sector, or a hollow spherical sector.

14. The system of claim 9, wherein the light source is at least one of a laser, a laser diode, a light-emitting diode, or a vertical cavity surface emitting laser.

15. The system of claim 9, wherein the photodetector is coupled to the window such that the photodetector is located at or near a node of maximum power of the outcoupled light.

16. The system of claim 9, wherein
the window is a Talbot resonator,
the photodetector is coupled to the window such that the photodetector is located at or near a location of self-image of the one or more light sources, and
the window has a Talbot configuration that is at least one of single object and single image, single object and multiple images, multiple objects and a single image, or multiple objects and multiple images.

17. The system of claim 9, wherein
the output signal is configured to render a notification on at least one of a graphical interface or a client device, and
the notification indicates that one or more foreign bodies are present on the window.

18. The system of claim 9, wherein the output signal is configured to at least one of initiate a cleaning sequence for the window, adjust a power of an illumination source, or adjust a camera setting.

19. A method for detecting contaminants on a window, comprising:
emitting, by a system comprising a processor, light rays toward a first edge of the window, wherein the emitting causes at least a fraction of the light rays to couple to the window and to propagate across the window to a second edge of the window as electromagnetic waves;
measuring, by the system, a radiation power of outcoupled light rays that are outcoupled from the window at the first edge or the second edge, wherein the uncoupled light rays are a subset of the electromagnetic waves;
determining, by the system, a difference between the radiation power of the outcoupled light rays and a defined baseline radiation value; and
in response to determining that the difference exceeds a defined threshold value, generating, by the system, an output signal that initiates a control operation.

20. The method of claim 19, wherein the generating the output signal comprises generating an output signal that at least one of initiates a window cleaning system, adjusts a power of an illumination source, adjusts an aperture setting of a photodetector system, or adjusts an integration time of the photodetector system.

* * * * *